United States Patent
Ezumi et al.

(10) Patent No.: US 7,121,450 B2
(45) Date of Patent: Oct. 17, 2006

(54) FRICTION STIR WELDING METHOD AND GROUP OF SHAPE MEMBERS FOR FRICTION STIR WELDING

(75) Inventors: Masakuni Ezumi, Hofu (JP); Masaaki Shigeyama, Kudamatsu (JP); Tetsuya Matsunaga, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 188 days.

(21) Appl. No.: 10/791,857

(22) Filed: Mar. 4, 2004

(65) Prior Publication Data

US 2005/0051601 A1 Mar. 10, 2005

(30) Foreign Application Priority Data

Sep. 4, 2003 (JP) .............................. 2003-312669

(51) Int. Cl.
*B23K 20/12* (2006.01)
(52) U.S. Cl. ..................................... 228/112.1; 228/2.1
(58) Field of Classification Search ................. 228/2.1, 228/112.1, 151; 52/638; 296/178; 428/599, 428/600, 654, 650, 598, 615; 156/73.5, 580
See application file for complete search history.

(56) References Cited

U.S. PATENT DOCUMENTS

| | | | |
|---|---|---|---|
| 5,979,742 A * | 11/1999 | Enomoto et al. ........ 228/112.1 |
| 6,193,137 B1 * | 2/2001 | Ezumi et al. ............ 228/112.1 |
| 6,315,187 B1 * | 11/2001 | Satou et al. ............. 228/112.1 |
| 6,378,264 B1 * | 4/2002 | Kawasaki et al. ............ 52/633 |
| 6,532,712 B1 * | 3/2003 | Kawasaki et al. ............ 52/693 |
| 6,599,641 B1 * | 7/2003 | Nakamura et al. .......... 428/593 |
| 2002/0095903 A1 | 7/2002 | Kawasaki et al. |

FOREIGN PATENT DOCUMENTS

| JP | 09309164 | 12/1997 |
|---|---|---|
| JP | 2002224858 A * | 8/2002 |

\* cited by examiner

*Primary Examiner*—Kevin Kerns
*Assistant Examiner*—Michael Aboagye
(74) *Attorney, Agent, or Firm*—Antonelli, Terry, Stout and Kraus, LLP.

(57) ABSTRACT

The purpose of the present invention is to provide a method that can be easily applied to friction stir welding where the thickness of face plates at one welding portion is different from the thickness of face plates at another welding portion. Three shape members 10, 11, 12 having two butt joint portions are mounted on a jig 15. The face plate 14 of shape member 10 is thick and the face plate 14 of shape member 12 is thin. The protruded height of projection 18 is greater at portion B where surface plates 14 being welded are thin than the protruded height of projection A where surface plates 14 are thick. The depths for inserting rotary tools to shape members 10, 11, 12 for friction stir welding are the same. Friction stir welding is facilitated since the size and insertion depth of all the rotary tools being applied can be the same.

13 Claims, 7 Drawing Sheets

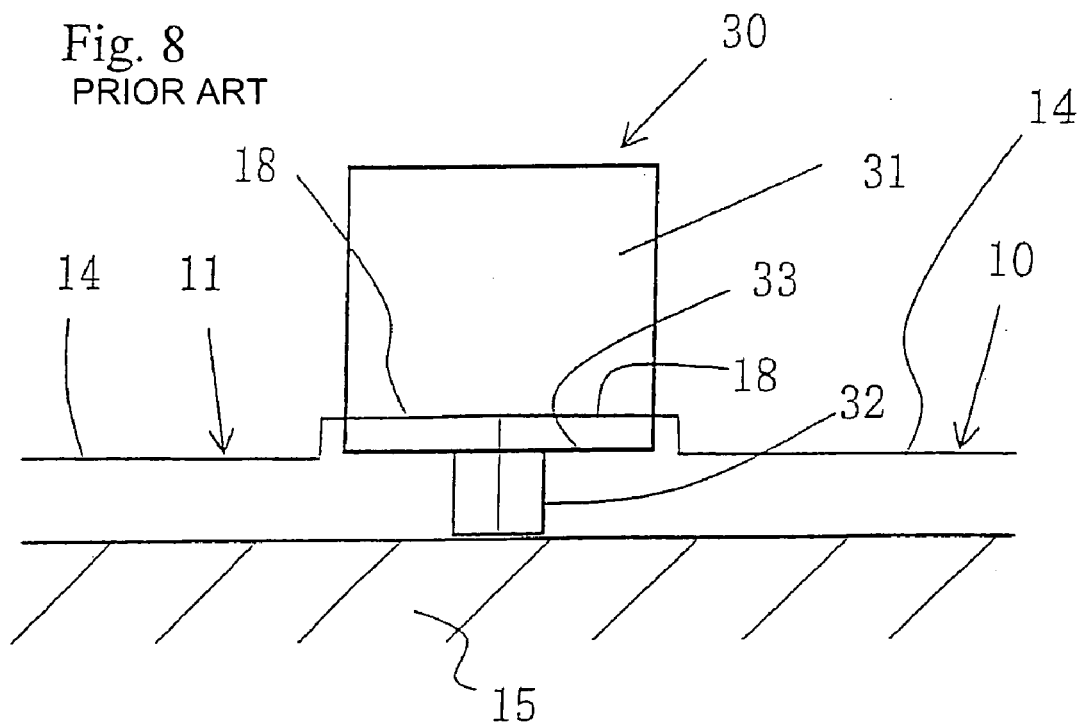
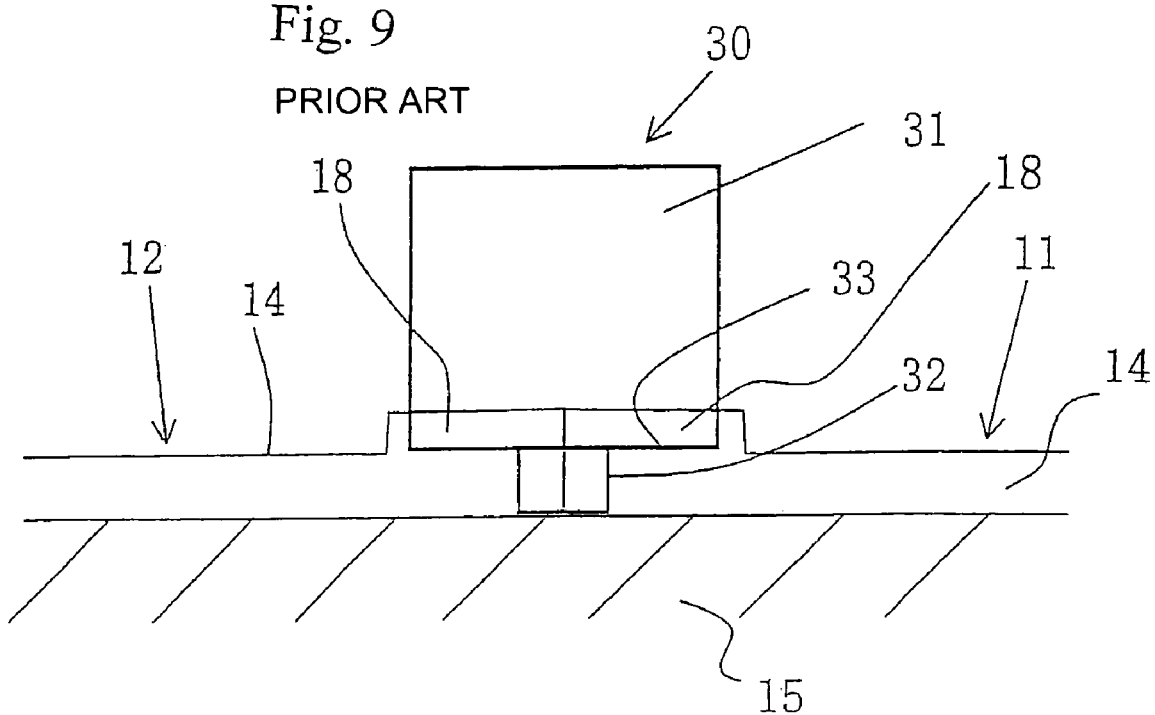

FRICTION STIR WELDING METHOD AND GROUP OF SHAPE MEMBERS FOR FRICTION STIR WELDING

The present application claims priority from Japanese patent application JP2003-312669 filed on Sep. 4, 2003, the content of which is hereby incorporated by reference into this application.

FIELD OF THE INVENTION

The present invention relates to a friction stir welding method, and to a group of shape members for friction stir welding.

DESCRIPTION OF THE RELATED ART

Friction stir welding is a method for inserting a rotary tool having a small diameter portion and a large diameter portion to a butted joint portion of aluminum shape members, and stirring, softening and plasticizing the same to carry out solid-phase welding thereof, as disclosed in patent document 1.

In the above disclosure, projections that protrude toward the thickness direction of a plate-shaped member are formed to the ends of the members, and the rotary tool is inserted from the side having the projections so that when a gap exists in the butted portion, the gap can be filled with the metal material constituting the projections. Some portions of the projections remain on the joint portion, so after completing the friction stir welding, the remaining projections are removed by a grinder.

The width of each shape member is approximately 30 cm to 40 cm, so in order to form a member having a larger width, plural shape members are welded together. The heights of the projections on the shape members are the same.

Patent Document 1: Japanese Patent No. 3014654

However, when considering the actual application of the friction stir welding method to a structure of a railway car, the thickness of the plate members constituting the railway car varies in different areas, and the height of the small diameter portion of the rotary tool must be substantially equal to the thickness of the plate member being welded. Therefore, rotary tools having different sizes must be used appropriately to correspond to various welding areas, which make the handling and management of the rotary tools troublesome.

The prior art method will be described in detail with reference to FIGS. 7 through 9. A side framing of a railway car is shown, and in the drawing, three shape members (hollow shape members) 10, 11 and 12 are butted against one another and mounted on a jig 15. Though the number of shape members used for building the actual railway car structure is much greater, the present example describes three members. There are two welding portions, A and B. Each shape member 10, 11, 12 has a rib 17 disposed on the upper surface of a face plate 14 for reinforcement, but in the drawing, only the rib 17 on the shape member 11 is illustrated, and the ribs on the other members 10 and 12 are not shown. A reinforcement member (not shown) is welded onto the rib. A projection 18 that protrudes toward the outer direction of thickness (upper direction in FIG. 7) of the face plate 14 is formed at each of the butting portions on the width-direction ends of the shape members 10, 11, 12.

The thickness of the face plate 14 of the shape member 10 is thicker than the thickness of the face plate 14 of other shape members 11 and 12. This is because the shape member 10 has a window (not shown) but the other shape members 11 and 12 do not. Therefore, the face plate 14 of the center shape member 11 is designed so that the side attached to the shape member 10 has a thickness corresponding to the face plate 14 of shape member 10, and the side attached to the shape member 12 has a thickness corresponding to the face plate 14 of shape member 12.

The protruded heights of the projections 18, 18 at a butt joint portion A between the shape members 10 and 11 are the same. The widths of the projections 18, 18 are also the same. The protruded heights of the projections 18 are determined so that during friction stir welding, the boundary 33 between the large diameter portion 31 and the small diameter portion 32 of the rotary tool 30 is positioned within the projections 18. If the overlap margin of the small diameter portion 32 and the projections 18 is zero (that is, if the boundary 33 is located along the extension of the outer surface of face plate 14), the outer surface of the face plate 14 will be dented, so in order to overcome this problem, the boundary 33 is located inside the projections 18. The length of the small diameter portion 32 is determined so that the head portion of the small diameter portion 32 is located near the back surface of the face plate 14 (or the jig 15) during friction stir welding.

The heights and widths of projections 18, 18 at a butt joint portion B between the shape members 11 and 12 are the same, which are also equal to the size of the projections on shape members 10 and 11. Friction stir welding is performed so that the boundary 33 between the large diameter portion 31 and the small diameter portion 32 of the rotary tool 30 is positioned within the projections 18. The length of the small diameter portion 32 is determined so that the head portion of the small diameter portion 32 is located near the back surface of the face plate 14 (or the jig 15) during welding.

One example of the plate thickness of the face plate 14 will be described, wherein the thickness of the face plate 14 of the shape member 10 is 4 mm, the thickness of the face plate 13 of the shape member 12 is 3 mm, and the thickness of the face plate 14 of the shape member 11 at the end adjacent to the shape member 10 is 4 mm and the end adjacent to the shape member 12 is 3 mm. The protruded height of the projections 18 at butt joint portion A is 2 mm, and the protruded height of the projections 18 at butt joint portion B is 2 mm. The width of the projections 18 is 6.5 mm.

According to such example, the rotary tool 30 for welding the butt joint portion A must have a small diameter portion 32 with a length of 5 mm, and the rotary tool 30 for welding the butt joint portion B must have a small diameter portion 32 with a length of 3 mm, so it is necessary to prepare rotary tools 30 having small diameter portions 32 with different lengths to correspond to the butt joint portions A and B.

As explained, if there are plural areas to be subjected to friction stir welding, a variety of rotary tools must be prepared to correspond to the areas to be welded.

Therefore, the object of the present invention is to enable a rotary tool 30 of a single size to correspond to all the areas to be welded.

SUMMARY OF THE INVENTION

The object of the present invention is achieved by a friction stir welding method comprising preparing plural members, each having projections at end portions of a plate that protrude toward a direction of thickness of the plate; butting an end portion of the plate against an end portion of an adjacent plate, wherein the thickness of the plate of at least one member is different from the thickness of the plate of another member, and the protruded height of the projections on the plates at a butt joint portion where the plate thickness is large is smaller than the protruded height of the projections on the plates where the plate thickness is small, and the protruded height of the projections on the plates at a butt joint portion where the plate thickness is small is larger than the protruded height of the projections on the plates where the plate thickness is large; and inserting rotary tools of the same size with the same insertion depth to the plates from the side having the projections, and performing friction stir welding.

BRIEF DESCRIPTION OF THE DRAWINGS

FIG. 8 is a vertical cross-sectional view of portion A of FIG. 7; and

FIG. 9 is a vertical cross-sectional view of portion B of FIG. 7.

DETAILED DESCRIPTION OF THE PREFERRED EMBODIMENT

The preferred embodiments of the present invention will now be described.

Embodiment 1

Figure 1:
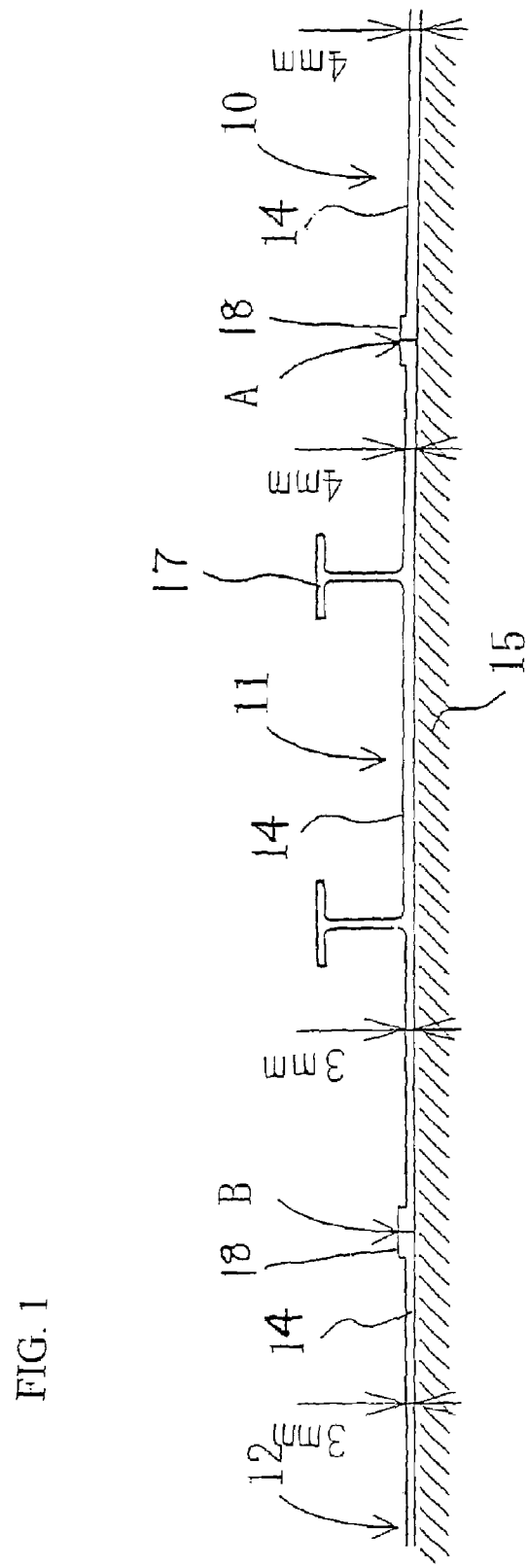
FIG. 1 is a vertical cross-sectional view showing a side framing subjected to friction stir welding according to one embodiment of the present invention.
Figure 2:
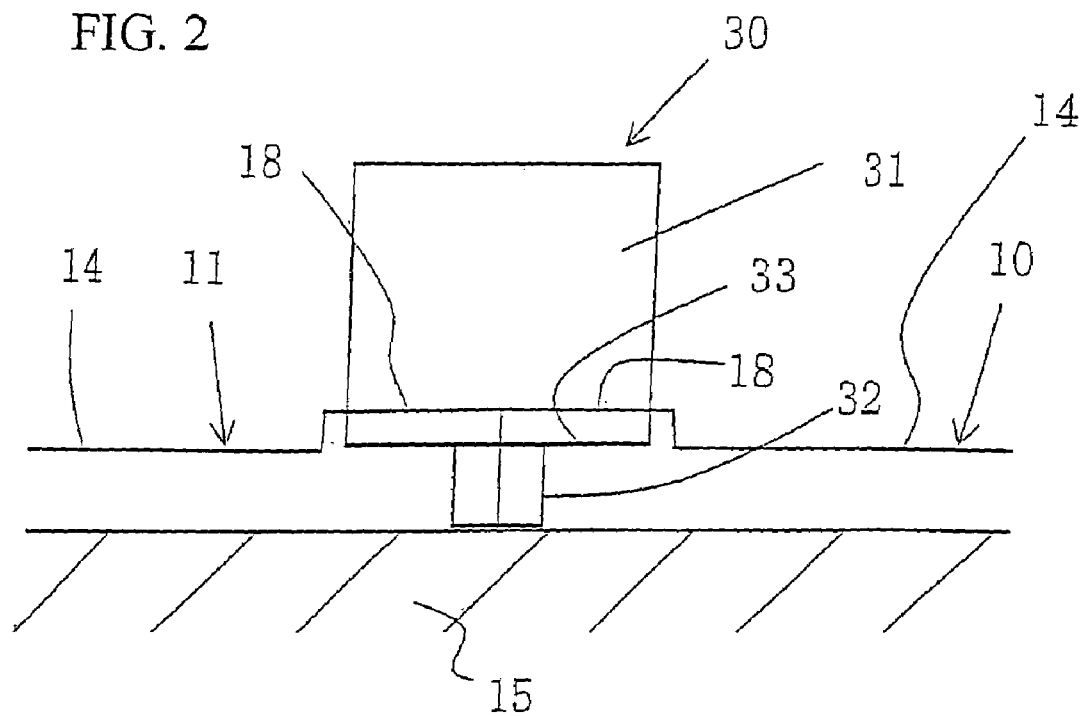
FIG. 2 is a vertical cross-sectional view of portion A of FIG. 1.
Figure 3:
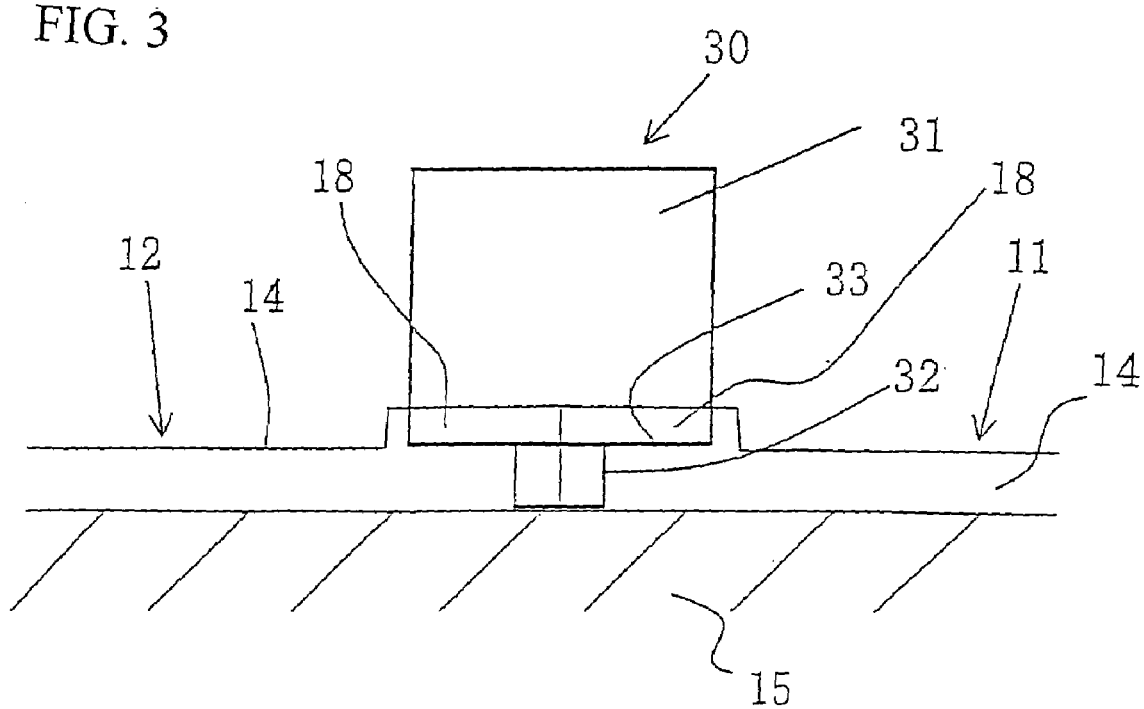
FIG. 3 is a vertical cross-sectional view of portion B of FIG. 1.
Figure 7:
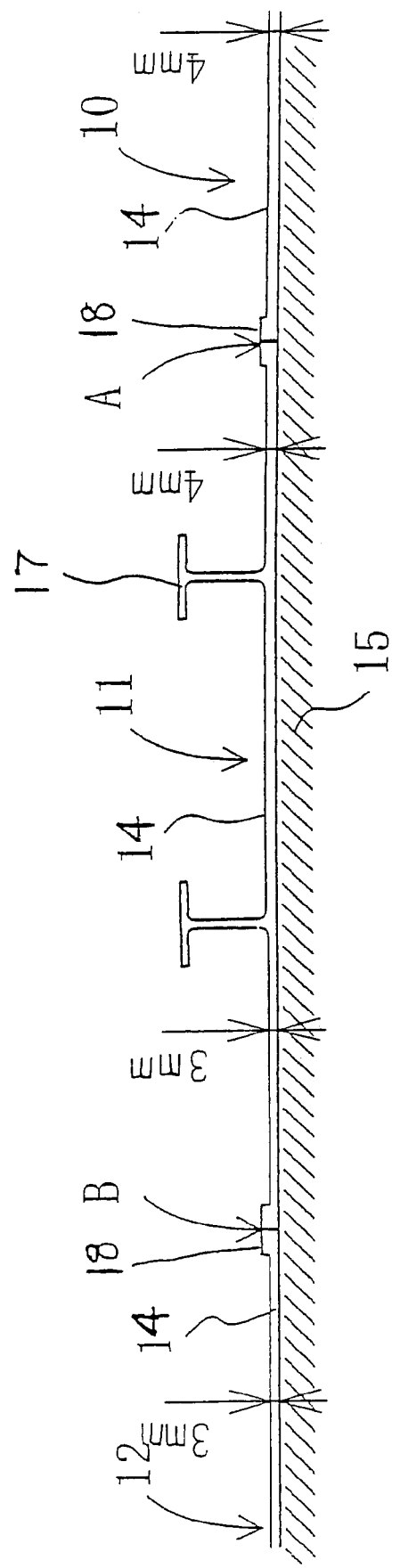
FIG. 7 is a front view of a side framing subjected to friction stir welding according to the prior art.

A first embodiment of the present invention will be described with reference to FIGS. 1 through 3. In FIG. 1, the thicknesses of the face plates 14 of shape members 10, 11 and 12 are the same as the example illustrated in FIG. 7. The thickness of the face plate 14 of shape member 10 is 4 mm, the thickness of the face plate 14 of shape member 12 is 3 mm, and the thickness of the face plate 14 of shape member 11 is 4 mm at the side adjacent to the shape member 10 and 3 mm at the side adjacent to the shape member 12.

The protruded height of projections 18, 18 at butt joint portion A between the shape member 10 and the shape member 11 is 2 mm, and the protruded height of projections 18, 18 at butt joint portion B between the shape member 12 and the shape member 11 is 3 mm, according to which the protruded height of the projections 18 at joint portion B is greater than the protruded height of the projections 18 at joint portion A. Thus, the thicknesses including the projections 18 and the face plate 14 of the plural shape members 10, 11 and 12 are all the same.

The lengths of the small diameter portions 32 of the rotary tools 30 for welding all the joint portions A, B are the same. That is, the length of the small diameter portion 32 of the rotary tool 30 for welding joint portion B is the same as that of the rotary tool 30 for welding joint portion A. The length of the small diameter portion 32 is greater than the thickness of the face plate 14 where the plate thickness is greatest. Actually, if the plate thickness 14 at portion A where the face plate thickness is greatest is 4 mm, the length of the small diameter portion 32 of the rotary tool is 5 mm, and the overlap margin of the projection 18 and small diameter portion 32 is 1 mm. If the plate thickness where the thickness is smallest is 3 mm, the overlap margin of the projection 18 and small diameter portion 32 is 1 mm. The external shape of the large diameter portions 31 of the rotary tools 30 for welding joint portions A and B are the same. The external shape of the small diameter portions 32 thereof are also the same.

According to such arrangement, rotary tools 30 having the above-mentioned size are disposed at joint portions A and B, and friction stir welding is performed. Even at joint portion A where the plate thickness is greatest, the insertion depth of the small diameter portion 32 of the rotary tool is the same as that of the prior art example, so friction stir welding can be performed in a similar manner as according to the prior art.

At joint portion B where the plate thickness is smallest, the boundary between the small diameter portion 32 and the large diameter portion 31 is placed 1 mm below the upper surface of the projection 18 while performing friction stir welding. The insertion depth of the small diameter portion 32 of the rotary tool 30 is controlled to be the same at all times. The boundary is placed 1 mm below the upper surface at both joint portions A and B.

Thus, there is no need to change the size of the rotary tool 30 for welding joint portions A and B, and the insertion depth of the rotary tool 30 can be the same.

Therefore, the welding operations can be facilitated.

If the side provided with the projections 18 constitutes the outer side of the car body, the projections 18 are cut and removed after completing friction stir welding, so that the joint portion constitutes a flat surface with the outer surface of the plate 13.

According to the above-mentioned embodiment, rotary tools are disposed at all the joint portions, and friction stir welding operations are performed simultaneously at all the joint portions, but it is also possible to perform friction stir welding of one joint portion A, and then thereafter, perform friction stir welding of the other joint portion B using the same rotary tool 30 used to weld joint portion A.

The present invention is applicable not only to extruded members made of aluminum but also to other members.

Embodiment 2

The first embodiment utilized a single-skin shape member, but the present invention can be applied to a double-skin shape member (hollow shape member). The welding depth of a rotary tool 30 cannot be defined clearly since the back surface of the joint portion of hollow shape members is not in contact with a jig 15, but basically, the depth is substantially equal to the plate thickness.

Figure 4:
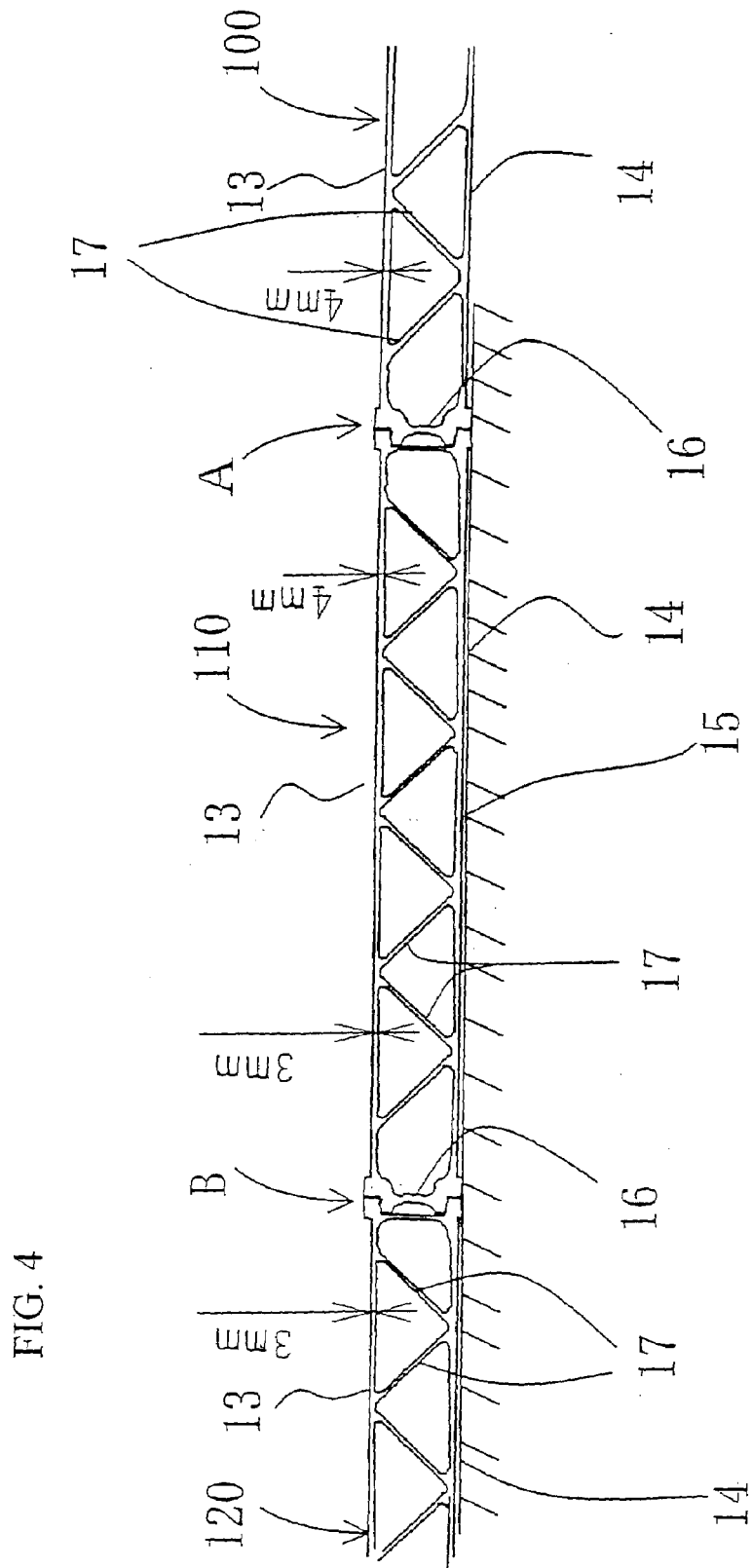
FIG. 4 is a front view of a side framing subjected to friction stir welding according to another embodiment of the present invention.
Figure 5:
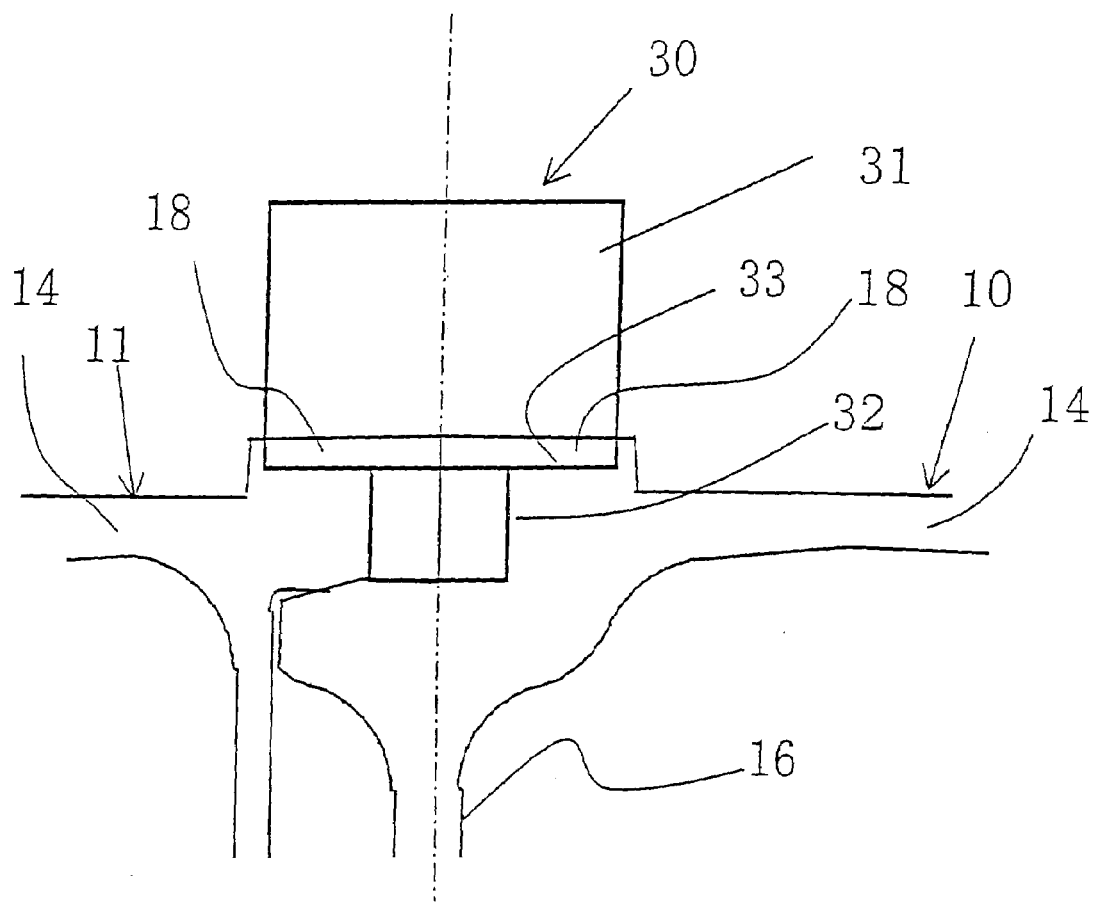
FIG. 5 is a vertical cross-sectional view of portion A of FIG. 4.
Figure 6:
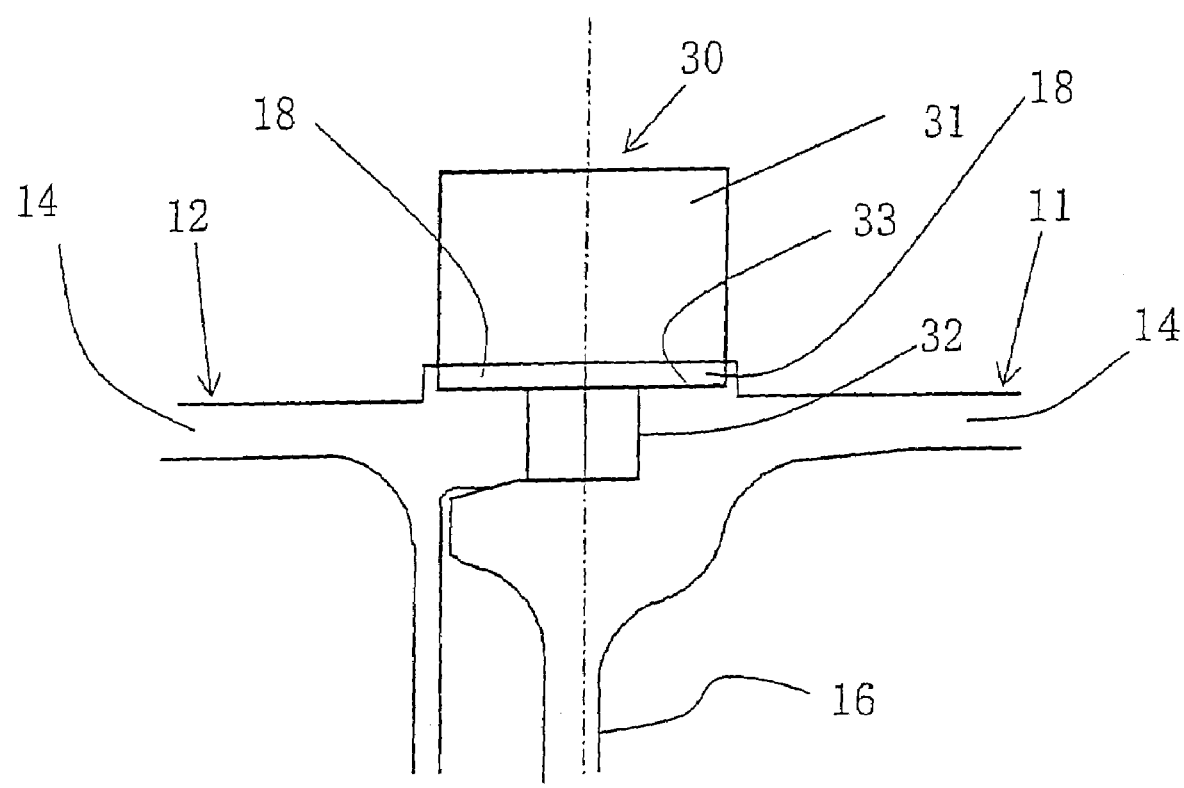
FIG. 6 is a vertical cross-sectional view of portion B of FIG. 4.

In FIG. 4, each of the hollow shape members 100, 110 and 120 is composed of two substantially parallel face plates 13 and 14, connecting plates 16 and 17 that connect the face plates 13 and 14, and projections 18 formed at width-direction ends of the shape member. The thicknesses of the face plates 13 and 14 of shape members 100, 110 and 120 are the same as the thicknesses of the face plates 14 illustrated in FIG. 1. The thickness of the face plates 13 and 14 of the shape members 100 is greater than the thickness of the face plates 13 and 14 of the shape member 120 (in other words, the thickness of the face plates 13, 14 of shape member 120 is small). The thickness of face plates 13 and 14 of the shape member 110 near a joint portion B with the shape member 120 is small, whereas the thickness of face plates 13 and 14 of the shape member 110 near a joint portion A with the shape member 100 is large.

The projections 18 of the butt joint portions are disposed at the ends of the face plates 13 and 14 and projected toward the outer surface of the hollow shape member. The projected height of the projections 18 at joint portion A is the same as the aforementioned example. The protruded height of the projections 18 at joint portion B is greater than the protruded height at joint portion A. The size and insertion depth of the rotary tools 30, 30 that are used to weld plural joint portions A and B are all the same. Actually, if the thickness of the plate 14 where the thickness is greatest is 4 mm, the length of the small diameter portion of the rotary tool is 5 mm, so the overlap margin of the projection 18 and the small diameter portion 32 is approximately 1 mm. If the thickness of the plate 13 and 14 at portion B where the thickness is smallest is 3 mm, the overlap margin of the projection 18 and the small diameter portion 32 is approximately 2 mm (since the length of small diameter portion 32 is 5 mm). Therefore, the thicknesses of the shape members 100, 110 and 120 including the projections 18 and the face plates 13 and 14 are all the same.

The external shape of the large diameter portion 31 of the rotary tool is the same as that of the rotary tool 30 of joint portion A. The external shape of the small diameter portion 32 is also the same as that of the rotary tool 30 of joint portion B.

At butt joint portions A and B, one of the shape members 110 and 120 are disposed to enter the ends of the other shape members 100 and 110. The ends of projections 18 and 18 (face plates 13 and 14) are located along an extension of the center of plate thickness of the connecting plate 16. The joint portions between the connecting plate 16 and the projections 18 (face plates 13 and 14) are recessed. These recessed portions receive the face plates 13 and 14 of the other hollow shape member.

The shape members 100, 110 and 120 are mounted on a jig 15, and the peak surface of the projections 18 of the face plates 13 on the side which is not subjected to friction stir welding at that time is in contact with the jig 15.

According to the above-mentioned arrangement, rotary tools 30 of the same above-mentioned size are disposed at the joint portions, and friction stir welding operations are performed simultaneously. At joint portion A where the plate thickness is large, the insertion depth of the small-diameter portion of the rotary tool to the joint is the same as according to the prior art, and portion A is friction stir welded in a manner similar to the prior art example.

At joint portion B where the plate thickness is small, friction stir welding is performed with the boundary between the small diameter portion 32 and the large diameter portion 31 placed 2 mm above the upper surface of the face plate. The force of insertion of the rotary tool 30 is transmitted through projections 18, 18, the connecting plate 16 and the projections 18, 18 to the jig 15.

Thus, there is no need to vary the size of the rotary tool 30 for welding joint portions A and B, and the insertion depth of the rotary tool 30 can be the same.

After completing the friction stir welding operation of the side of face plate 14, the shape members 100, 110 and 120 are turned up-side down so as to have the projections on the face plate 13 protrude upward, and friction stir welding operation is performed thereto using the same rotary tools 30 with the same insertion depth.

What is claimed is:

1. A friction stir welding method, comprising:
   preparing plural members, each having projections at end portions of a plate that protrude toward a direction of thickness of the plate;
   butting an end portion of the plate against an end portion of an adjacent plate, wherein the thickness of the plate of at least one member is different from the thickness of the plate of another member, and a protruded height of the projections on the plates at a butt joint portion where the plate thickness is large is smaller than the protruded height of the projections on the plates where the plate thickness is small, and the protruded height of the projections on the plates at a butt joint portion where the plate thickness is small is larger than the protruded height of the projections on the plates where the plate thickness is large; and
   inserting rotary tools of the same size with the same insertion depth to the plates from the side having the projections, and performing friction stir welding.

2. The friction stir welding method according to claim 1, wherein
   said members are hollow shape members; and
   each of the hollow shape members comprises two substantially parallel face plates, connecting plates connecting the two face plates, and projections formed at width-direction-end portions of each of the hollow shape members.

3. The friction stir welding method according to claim 1, wherein said plural members include at least three members, the three members butting end portions so as to provide two butt joint portions between adjacent members of said three members, wherein plate thicknesses of the adjacent members at one of the two butt joint portions is thinner than the plate thicknesses of the adjacent members at the other of the two butt joint portions, and with the three members having projections at the butt joint portions, the protruded height of the projections on the plates at the butt joint portion where the plate thickness is small is larger than the protruded height of the projections on the plates where the plate thickness is large.

4. The friction stir welding method according to claim 3, wherein said projections extend above faces of the plates only at the end portions of the plates.

5. The friction stir welding method according to claim 4, wherein, of the three members, the first and third members sandwiching the second member, the first and third members respectively have thicker and thinner plates, and the second member has a plate thickness equal to the plate thickness of the first member adjacent the first member and has a plate thickness equal to the plate thickness of the third member adjacent the third member.

6. The friction stir welding method according to claim 5, wherein the protruded height of the projections of the first and second members adjacent each other is the same, and the protruded height of the projections of the second and third members adjacent each other is the same, the protruded height of the projections of the first and second members adjacent each other being smaller than the protruded height of the projections of the second and third members adjacent each other.

7. The friction stir welding method according to claim 3, wherein the rotary tools are inserted simultaneously into the two butt joint portions, and perform simultaneously to the two butt joint portions the friction stir welding.

8. The friction stir welding method according to claim 3, wherein the rotary tools are inserted in sequence into the two butt joint portions, and the friction stir welding is performed on the two butt joint portions in sequence.

9. The friction stir welding method according to claim 3, wherein total thicknesses of the plates and projections at each of the end portions of the first, second and third members are the same.

10. The friction stir welding method according to claim 1, wherein said projections extend only at said end portions of said plates.

11. The friction stir welding method according to claim 1, wherein total thicknesses of the plates and projections at each of said end portions are the same.

12. The friction stir welding method according to claim 1, wherein said rotary tools are inserted simultaneously into the butt joint portions so as to simultaneously perform the friction stir welding at the butt joint portions.

13. The friction stir welding method according to claim 1, wherein said rotary tools are inserted in sequence into the butt joint portions so as to perform the friction stir welding at the butt joint portions in sequence.

* * * * *